United States Patent
Ozeki

(10) Patent No.: US 10,698,382 B2
(45) Date of Patent: Jun. 30, 2020

(54) NUMERICAL CONTROLLER

(71) Applicant: Fanuc Corporation, Minamitsuru-gun, Yamanashi (JP)

(72) Inventor: Shinichi Ozeki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/245,997

(22) Filed: Jan. 11, 2019

(65) Prior Publication Data

US 2019/0227518 A1 Jul. 25, 2019

(30) Foreign Application Priority Data

Jan. 19, 2018 (JP) ................................ 2018-007273

(51) Int. Cl.
  *G05B 19/404* (2006.01)
  *G05B 19/4093* (2006.01)

(52) U.S. Cl.
  CPC ..... *G05B 19/404* (2013.01); *G05B 19/40938* (2013.01); *G05B 2219/50289* (2013.01)

(58) Field of Classification Search
  CPC ........................ G05B 19/404; G05B 19/4093
  See application file for complete search history.

(56) References Cited

U.S. PATENT DOCUMENTS

2012/0093603 A1 4/2012 Ueno
2016/0282840 A1* 9/2016 Iwamura .......... G05B 19/40938
2016/0291582 A1* 10/2016 Iwamura .............. G05B 19/409
2017/0168698 A1 6/2017 Sakamoto et al.
2018/0349023 A1* 12/2018 Taniguchi ............. G06F 3/0488

FOREIGN PATENT DOCUMENTS

| JP | 09320956 A | 12/1997 |
|----|-----------|---------|
| JP | 1142534 A | 2/1999 |
| JP | 2008197859 A | 8/2008 |
| JP | 2012-081562 A | 4/2012 |
| JP | 2017111516 A | 6/2017 |

OTHER PUBLICATIONS

Japanese Notice of Reasons for Refusal for Japanese Application No. 2018-007273, dated Dec. 24, 2019, with translation, 6 pages.

* cited by examiner

*Primary Examiner* — Vincent H Tran

(74) *Attorney, Agent, or Firm* — RatnerPrestia

(57) ABSTRACT

A numerical controller capable of determining whether or not an input numerical value of an operator is within a range of a limit value includes: an input receiving unit receiving various operations of the operator and input of numerical values for input items; an input numerical value limiting unit determining whether or not the input numerical value is within the range of the limit value; a limit value changing unit changing the limit value when the input receiving unit receives a specific operation; and a limit value restoring unit restoring the limit value to a value before the change when the specific operation is completed.

5 Claims, 4 Drawing Sheets

FIG. 1

| TOOL CORRECTION | | | | | O0000 N00000 | |
|---|---|---|---|---|---|---|
| | (LENGTH) | | (RADIUS) | | RELATIVE COORDINATE | |
| NUMBER | SHAPE | ABRASION | SHAPE | ABRASION | X1 | 0.000 |
| 001 | 10.000 | 0.000 | 0.000 | 0.000 | Y1 | 0.000 |
| 002 | 10.000 | 0.000 | 0.000 | 0.000 | Z1 | 0.000 |
| 003 | 10.000 | 0.000 | 0.000 | 0.000 | B1 | 0.000 |
| 004 | 10.000 | 0.000 | 0.000 | 0.000 | C1 | 0.000 |
| 005 | 10.000 | 0.000 | 0.000 | 0.000 | ABSOLUTE COORDINATE | |
| 006 | 0.000 | 0.000 | 0.000 | 0.000 | X1 | 87.200 |
| 007 | 0.000 | 0.000 | 0.000 | 0.000 | Y1 | 0.000 |
| 008 | 0.000 | 0.000 | 0.000 | 0.000 | Z1 | -0.005 |
| 009 | 0.000 | 0.000 | 0.000 | 0.000 | B1 | 60.000 |
| 010 | 0.000 | 0.000 | 0.000 | 0.000 | C1 | 0.000 |
| 011 | 0.000 | 0.000 | 0.000 | 0.000 | MACHINE COORDINATE | |
| 012 | 0.000 | 0.000 | 0.000 | 0.000 | X1 | 87.200 |
| 013 | 0.000 | 0.000 | 0.000 | 0.000 | Y1 | 0.000 |
| 014 | 0.000 | 0.000 | 0.000 | 0.000 | Z1 | -0.005 |
| 015 | 0.000 | 0.000 | 0.000 | 0.000 | B1 | 60.000 |
| 016 | 0.000 | 0.000 | 0.000 | 0.000 | C1 | 0.000 |

WARNING

A>12.0

DATA IS NOT WITHIN RANGE

| No. | INPUT ITEM NAME | NORMAL LIMIT VALUE | SPECIFIC OPERATION | CHANGED LIMIT VALUE |
|---|---|---|---|---|
| 1 | TOOL OFFSET AMOUNT | Th1-1 | TOOL ADDITION | Th1-2 |
| 2 | WORK ORIGIN OFFSET AMOUNT | Th2-1 | WORK COORDINATE SYSTEM SETTING | Th2-2 |
| 3 | NUMERICAL VALUE PART OF PROGRAM | Th3-1 | MACHINING PROGRAM LOADING | Th3-2 |
| 4 | .. | .. | .. | .. |

105

NUMERICAL CONTROLLER

CROSS-REFERENCE TO RELATED APPLICATION

This application is a new U.S. Patent Application that claims benefit of Japanese Patent Application No. 2018-007273 filed Jan. 19, 2018, the disclosure of this application is being incorporated herein by reference in its entirety for all purposes.

BACKGROUND OF THE INVENTION

1. Field of the Invention

The present invention relates to a numerical controller, and in particular to a numerical controller that discriminates an operation type of an operator and changes an input limit value according to the operation type.

2. Description of the Related Art

When a numerical value (for example, a tool offset amount, a work origin offset amount, a numerical value part of a machining program, and the like) is input to a numerical controller by an operator, if a value greatly deviated from an original input value is input due to an input mistake, it may lead to serious accidents such as breakage of tools and workpieces.

Therefore, a conventional numerical controller has a function of limiting an input value or an amount of change in the input value so that the value cannot be changed largely at once. For example, if a change amount limit value is 1.0, it is not allowed to change an existing input value 10.0 to 12.0. When an input value exceeding a predetermined limit is input to the numerical controller having such a limiting function, an operation such as giving a warning to the operator, for example, by displaying a warning as illustrated in FIG. 1 or the like is performed.

Japanese Patent Application Laid Open No. 2012-81562 A also discloses a configuration in which only a rotational speed within a range of an upper limit value and a lower limit value is adopted in a controller that can input an allowable rotation speed via an input device.

However, some operations performed by an operator are such that numerical values have to be changed largely compared to ordinary operations. For example, there is a case where, in a setting work such as installing a new tool, setting a new work coordinate system, loading a new machining program, it is necessary to input a large value for an initial setting or to change an existing input value largely. In such a case, if a limit value of an input value or a change amount of the input value is set, there arises a problem that an operation is interfered with or a work efficiency is remarkably deteriorated. For this reason, in the related art, when performing a setting operation, countermeasures such as a setting change to alleviate the limit value in advance were necessary.

Such a related-art work method has problems such as a complicated work of relaxing the limit value every time or forgetting to restore the relaxed limit value to an original value.

SUMMARY OF THE INVENTION

The present invention has been made to solve the aforementioned problems and intends to provide a numerical controller that discriminates an operation type of an operator and changes an input limit value according to the operation type.

A numerical controller according to an embodiment of the present invention is a numerical controller capable of determining whether or not an input numerical value of an operator is within a range of a limit value, the numerical controller including: an input receiving unit receiving various operations of the operator and input of numerical values for input items; an input numerical value limiting unit determining whether or not the input numerical value is within the range of the limit value; a limit value changing unit changing the limit value when the input receiving unit receives a specific operation; and a limit value restoring unit restoring the limit value to a value before the change when the specific operation is completed.

In the numerical controller according to an embodiment of the present invention, the input receiving unit determines whether or not the specific operation has been received based on a window name being displayed.

In the numerical controller according to an embodiment of the present invention, the limit value changing unit changes the limit value of a tool offset amount when the input receiving unit receives a tool addition operation.

In the numerical controller according to an embodiment of the present invention, the limit value changing unit changes the limit value of a work origin offset amount when the input receiving unit receives a work coordinate system setting operation.

In the numerical controller according to an embodiment of the present invention, the limit value changing unit changes the limit value of a numerical value part of a machining program when the input receiving unit receives a machining program loading operation.

According to the present invention, it is possible to provide a numerical controller that discriminates an operation type of an operator and changes an input limit value according to the operation type.

BRIEF DESCRIPTION OF THE DRAWINGS

The foregoing and other objects and features of the present invention will become apparent from the following description of embodiments with reference to the accompanying drawings. Of those drawings:

FIG. 1 is a diagram illustrating an example of input limitation in a related-art numerical controller;

FIG. 5 is a diagram illustrating an example of storage contents of a storage unit.

DETAILED DESCRIPTION OF THE PREFERRED EMBODIMENTS

A configuration of a numerical controller 1 according to an embodiment of the present invention will be described.

Figure 2:
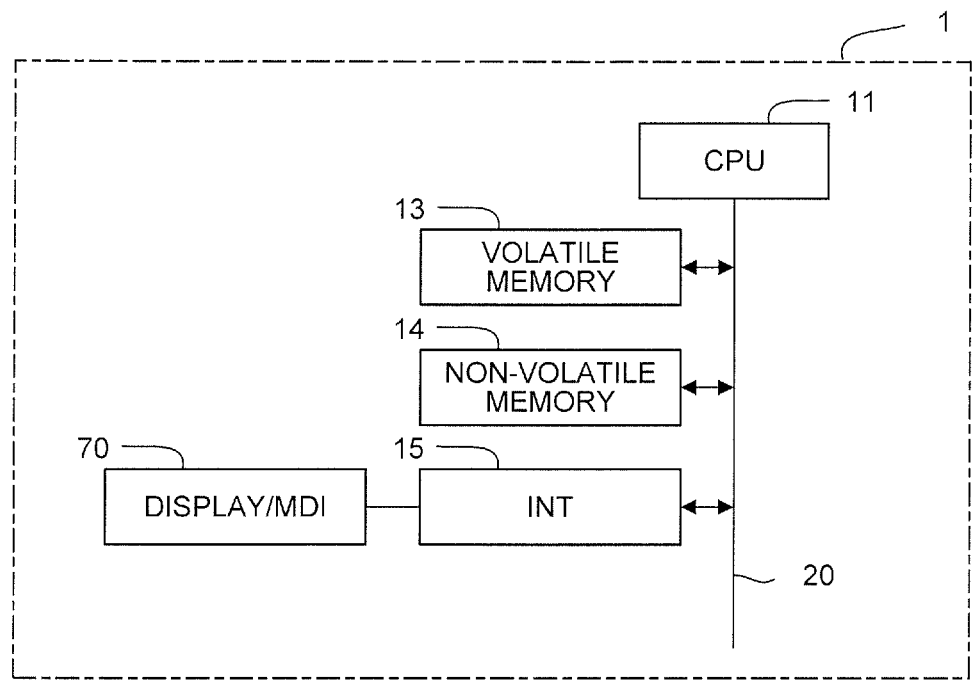
FIG. 2 is a block diagram illustrating a hardware configuration of a numerical controller.

FIG. 2 is a schematic hardware configuration diagram of main parts of the numerical controller 1 according to the embodiment of the present invention.

A CPU 11 included in the numerical controller 1 is a processor that controls the numerical controller 1 as a whole.

The CPU 11 loads a program stored in a nonvolatile memory 14 via a bus 20, and controls the entire numerical controller 1 according to the program.

The nonvolatile memory 14 is configured as a memory that is kept in a storage state even when a power supply of the numerical controller 1 is turned off, for example, by being backed up by a battery (not illustrated). The program and data stored in the nonvolatile memory 14 may be developed in a volatile memory 13 at the time of use. In the volatile memory 13, in addition to the program and data developed from the nonvolatile memory 14, temporary calculation data and display data, data input via an input device 71, and the like are stored.

A display/MDI unit 70 is a data input/output device including a display, a keyboard, and the like. Commands and data input from a keyboard of the display/MDI unit 70 are passed to the CPU 11 via an interface 15. Further, the display data output from the CPU 11 is displayed on the display of the display/MDI unit 70 via the interface 15.

Figure 3:
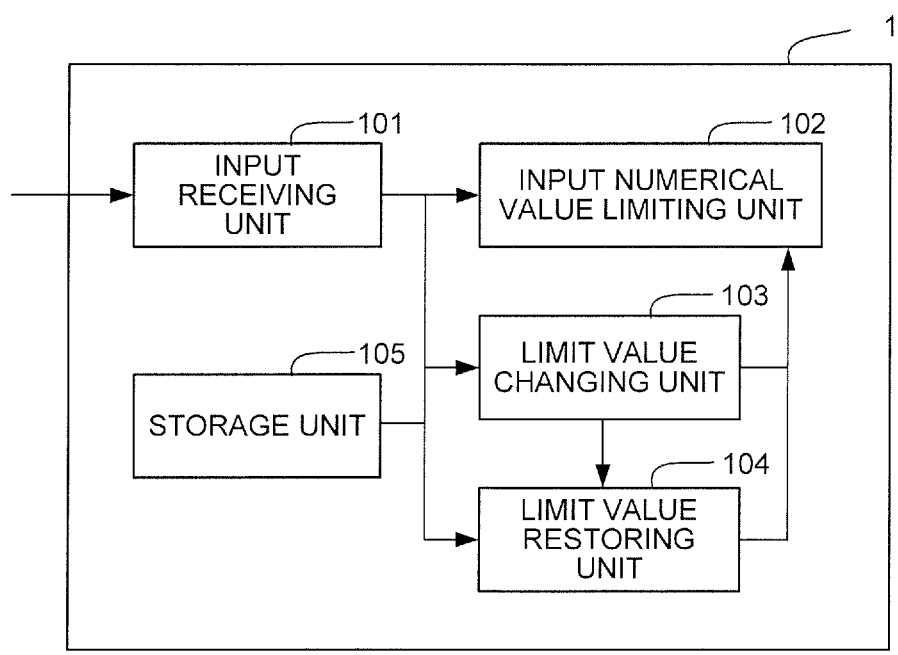
FIG. 3 is a block diagram illustrating a functional configuration of the numerical controller.

FIG. 3 is a block diagram illustrating a schematic functional configuration of the numerical controller 1 according to the embodiment of the present invention.

The numerical controller 1 includes an input receiving unit 101, an input numerical value limiting unit 102, a limit value changing unit 103, a limit value restoring unit 104, and a storage unit 105.

The input receiving unit 101 receives an operation of an operator and performs a process of specifying a type of the operation. The operation here includes, for example, adding a tool, setting a work coordinate system, loading a machining program, closing an input window, starting processing, and the like. Further, a process of receiving an input numerical value input by the user via a keyboard or the like is performed.

The input numerical value limiting unit 102 determines whether or not the input numerical value received by the input receiving unit 101 is within a predetermined limit range. If it is within the limit range, the input numerical value is handed over to other processing. On the other hand, if it is not within the limit range, the input numerical value is not handed over to other processing. In this case, it is possible to display a warning and urge the operator to re-input.

The limit value changing unit 103 performs a process of changing a limit value used when the input numerical value limiting unit 102 makes the aforementioned determination when the input receiving unit 101 detects a specific type of the operation. Here, the specific type of operation is, for example, an operation of opening a specific window necessary for performing the aforementioned work of setting.

After the limit value changing unit 103 changes the limit value, the limit value restoring unit 104 performs a process of returning the limit value to a state before the change if a predetermined condition is fulfilled. Here, the predetermined condition is, for example, performing an operation of closing an input window, starting a machining, and the like.

The storage unit 105 correlates and stores input item names, normal (that is, when no change is made) limit values, operations of the operator, and changed limit values to be applied when the pertinent operation is performed. FIG. 5 illustrates an example of storage contents of the storage unit 105. In this example, the limit value of the input value of the tool offset amount is normally set to Th1-1. Here, Th1-1 may be, for example, an upper limit value, a lower limit value or a limit value of a change amount.

However, when a tool addition operation is detected, the limit value of the input value of the tool offset amount is changed to Th1-2.

Thereafter, the limit value of the input value of the tool offset amount is returned to Th1-1 under a predetermined condition.

Figure 4:
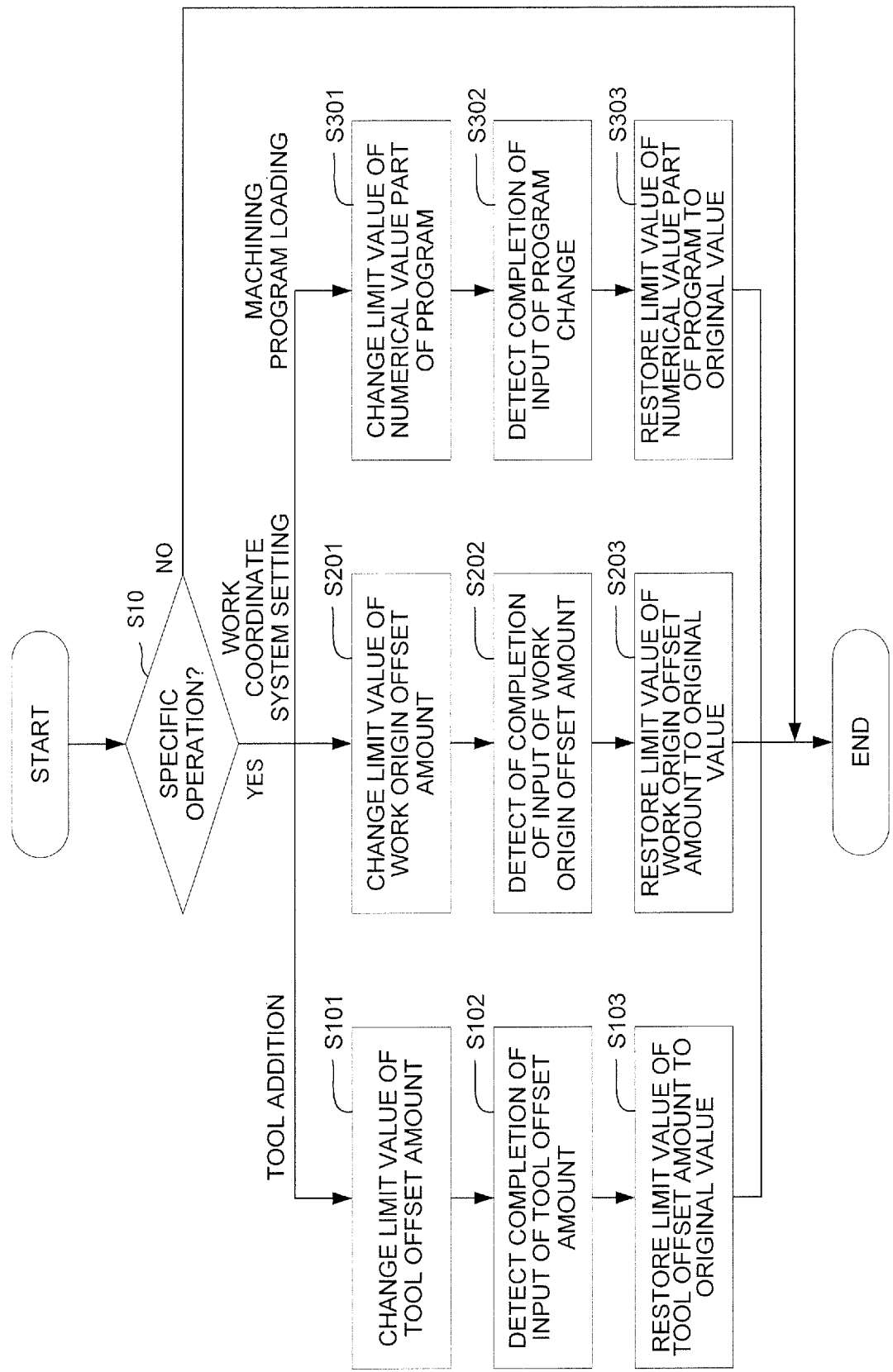
FIG. 4 is a flowchart illustrating an operation of the numerical controller.

The operation of the numerical controller 1 will be described using a flowchart of FIG. 4. In the present embodiment, an example will be described in which the limit value is changed when detecting operations of adding a tool, setting a work coordinate system and loading a machining program, which are typical setting operations.

S10: the operator starts some operation on the input receiving unit 101 of the numerical controller 1. The input receiving unit 101 determines a type of the operation of the operator. Typically, a name of an input window opened on the operation panel is obtained, whereby the input receiving unit 101 can specify a type of an operation the operator is about to perform. For example, if a tool addition window is opened, it can be specified that the operator is performing an operation of newly adding a tool. If the work coordinate system window is opened, it can be specified that a work coordinate system setting operation is being performed. If a machining program loading window is open, it can be specified that the operator is performing a machining program loading operation.

If the tool addition operation is detected, the process proceeds to S101. If the work coordinate system setting operation is detected, the process proceeds to S201. If the machining program loading operation is detected, the process proceeds to S301.

S101: with reference to the storage unit 105, the limit value changing unit 103 acquires the input item name requiring the limit value to be changed at the time of the tool addition operation and the changed limit value. According to the storage unit 105 of FIG. 5, the input item name=the tool offset amount and the limit value=Th1-2 associated with the tool addition operation are acquired.

The input receiving unit 101 receives an input of the tool offset amount. At this time, the input numerical value limiting unit 102 determines whether the input numerical value received by the input receiving unit 101 is within a range of the changed limit value Th1-2 acquired in S101. If it is within the range of the limit value Th1-2, the input numerical value is handed over to the subsequent processing. On the other hand, when it is not within the range of the limit value Th1-2, the input numerical value is not handed over to the subsequent processing, and a process such as urging the operator to re-input by displaying a warning is performed.

S102: when the limit value restoring unit 104 detects that the tool addition window is closed or the machining is started, it determines that the tool addition operation has ended. At this time, the limit value restoring unit 104 refers to the storage unit 105, and acquires the input item name which is affected by the change of the limit value by the tool addition operation and a normal limit value of the pertinent input item. According to the storage unit 105 in FIG. 5, the input item name=the tool offset amount and the limit value=Th1-1 associated with the tool addition operation are acquired.

S103: thereafter, when the input receiving unit 101 receives the input of the tool offset amount, the input numerical value limiting unit 102 determines whether or not the input numerical value received by the input receiving unit 101 is within the range of the changed limit value Th1-1 acquired in S102. If it is within the range of the limit value Th1-1, the input numerical value is handed over to the subsequent processing. On the other hand, if it is not within the range of the limit value Th1-1, the input numerical value is not handed over to the subsequent processing, and a process such as urging the operator to re-input by displaying a warning is performed.

S201: the limit value changing unit 103 refers to the storage unit 105 and acquires the input item name requiring the limit value to be changed and the changed limit value at the time of the work coordinate system setting operation. According to the storage unit 105 of FIG. 5, the input item name=a work origin offset amount and the limit value=Th2-2 associated to the work coordinate system setting operation are acquired.

The input receiving unit 101 receives input of the work origin offset amount. At this time, the input numerical value limiting unit 102 determines whether or not the input numerical value received by the input receiving unit 101 is within the range of the changed limit value Th2-2 acquired in S201. If it is within the range of the limit value Th2-2, the input numerical value is handed over to the subsequent processing. On the other hand, if it is not within the range of the limit value Th2-2, the input numerical value is not handed over to the subsequent processing, and a process such as urging the operator to re-input by displaying a warning is performed.

S202: when the limit value restoring unit 104 detects that the work coordinate system setting window is closed or the machining is started, the limit value restoring unit 104 determines that the work coordinate system setting operation has ended. At this time, the limit value restoring unit 104 refers to the storage unit 105 and acquires the input item name affected by the limit value change by the work coordinate system setting operation and a normal limit value of the pertinent input item. According to the storage unit 105 of FIG. 5, the input item name=the work origin offset amount and the limit value=Th2-1 associated with the work coordinate system setting operation are acquired.

S203: thereafter, when the input receiving unit 101 receives the input of the work origin offset amount, the input numerical value limiting unit 102 determines whether or not the input numerical value received by the input receiving unit 101 is within the range of the changed limit value Th2-1 acquired in S202. If it is within the range of the limit value Th2-1, the input numerical value is handed over to the subsequent processing. On the other hand, if it is not within the range of the limit value Th2-1, the input numerical value is not handed over to the subsequent processing, and processing such as urging the operator to re-input by displaying a warning is performed.

S301: the limit value changing unit 103 refers to the storage unit 105 and acquires the input item name requiring the limit value to be changed at the time of the machining program loading operation and the changed limit value. According to the storage unit 105 of FIG. 5, the input item name=a numerical value part of the program and the limit value=Th3-2 associated with the machining program loading operation are acquired.

The input receiving unit 101 receives an input of the numerical value part of the program. At this time, the input numerical value limiting unit 102 determines whether or not the input numerical value received by the input receiving unit 101 is within the range of the changed limit value Th3-2 acquired in S301. If it is within the range of the limit value Th3-2, the input numerical value is handed over to the subsequent processing. On the other hand, when it is not within the range of the limit value Th3-2, the input numerical value is not handed over to the subsequent processing, and processing such as urging the operator to re-input by displaying a warning is performed.

S302: when the limit value restoring unit 104 detects that the machining program loading window is closed or the machining is started, the limit value restoring unit 104 determines that the machining program loading operation has ended. At this time, the limit value restoring unit 104 refers to the storage unit 105 and acquires the input item name which is affected by the change of the limit value by the machining program loading operation and a normal limit value of the pertinent input item. According to the storage unit 105 in FIG. 5, the input item name=the numerical value part of the program and the limit value=Th3-1 associated with the machining program loading operation are acquired.

S303: thereafter, when the input receiving unit 101 receives the input of the numerical value part of the program, the input numerical value limiting unit 102 determines whether or not the input numerical value received by the input receiving unit 101 is within the range of the changed limit value Th3-1 acquired in S302. If it is within the range of the limit value Th3-1, the input numerical value is handed over to subsequent processing. On the other hand, if it is not within the range of the limit value Th3-1, the input numerical value is not handed over to the subsequent processing, and the processing such as urging the operator to re-input by displaying a warning is performed.

According to the present embodiment, when receiving a specific type of operation, the numerical controller 1 automatically changes the limit value of the input numerical value corresponding to the operation. Further, it detects that the operation is completed and automatically restores the limit value to an original value. Thus, it is possible to extremely easily perform a work of relaxing the limit value. In addition, it is possible to suppress occurrence of a situation in which it is forgotten to restore the relaxed limit value to an original value.

Incidentally, the present invention is not limited to the aforementioned embodiments, but can be implemented in various modes by making appropriate changes. For example, in the aforementioned embodiments, the tool addition, the work coordinate system setting, and the machining program loading are exemplified as the operation that triggers the change of the limit value, but the present invention is not limited thereto. The operation as a trigger for changing the limit value can be freely set by defining the operation in the storage unit 105.

Further, as a trigger for restoring the limit value to the original value, closing the input window and starting the machining are exemplified, but the present invention is not limited thereto. It is possible for the user to adopt any other trigger such as a trigger capable of determining that the operation requiring the change of the limit value has been completed.

Although the embodiments of the present invention have been described above, the present invention is not limited to the examples of the aforementioned embodiments, but other modes can be implemented by making appropriate changes.

The invention claimed is:

1. A numerical controller capable of determining whether or not an input numerical value of an operator is within a range of a limit value, the numerical controller comprising:
    an input receiving unit receiving various operations of the operator and input of numerical values for input items;
    an input numerical value limiting unit determining whether or not the input numerical value is within the range of the limit value;

a limit value changing unit changing the limit value when the input receiving unit receives a specific operation; and a limit value restoring unit restoring the limit value to a value before the change when the specific operation is completed.

2. The numerical controller according to claim 1, wherein the input receiving unit determines whether or not the specific operation has been received based on a window name being displayed.

3. The numerical controller according to claim 1, wherein the limit value changing unit changes the limit value of a tool offset amount when the input receiving unit receives a tool addition operation.

4. The numerical controller according to claim 1, wherein the limit value changing unit changes the limit value of a work origin offset amount when the input receiving unit receives a work coordinate system setting operation.

5. The numerical controller according to claim 1, wherein the limit value changing unit changes the limit value of a numerical value part of a machining program when the input receiving unit receives a machining program loading operation.

* * * * *